United States Patent [19]

Maier et al.

[11] Patent Number: 4,837,935

[45] Date of Patent: Jun. 13, 1989

[54] JIG SAW

[76] Inventors: Peter Maier, Gerokstrasse 1, D-7311 Neidlingen; Rolf Simen, Birnblütenweg 15, D-7000 Stuttgart 80, both of Fed. Rep. of Germany

[21] Appl. No.: 37,710

[22] Filed: Apr. 13, 1987

[30] Foreign Application Priority Data

Apr. 19, 1986 [DE] Fed. Rep. of Germany ....... 3613279

[51] Int. Cl.$^4$ ...................... B23D 49/16; B27B 19/02
[52] U.S. Cl. ......................................... 30/392; 83/828
[58] Field of Search ................................. 30/392–394; 83/827–829

[56] References Cited

U.S. PATENT DOCUMENTS 4,665,617  5/1987  Maier et al. ....................... 30/392 X

FOREIGN PATENT DOCUMENTS 3509515  9/1986  Fed. Rep. of Germany .

Primary Examiner—Douglas D. Watts
Attorney, Agent, or Firm—McGlew & Tuttle

[57] ABSTRACT

A jig or sabre saw has a horizontal foot to be placed on the work to be sawn. A drive unit is pivotally mounted on the foot and drives the tool in a tool holder. The two sides of the saw or other tool are supported by a guide device at points directly above the foot. The guide device is adapted to pivot with the drive unit so support the saw blade even when performing bevel cuts. The guide device and the drive unit may be arranged to pivot about two axes or about a single axis in relation to the foot.

13 Claims, 3 Drawing Sheets

JIG SAW

BACKGROUND OF THE INVENTION

The invention relates to jig saws of the type comprising a saw foot whose lower surface is placed on a support such as a workpiece and a drive unit which is carried by the saw foot and may be rocked in relation thereto (for instance by being tilted sideways in relation to the direction of motion of the jig saw). The drive unit is adapted to drive a tool such as jig saw blade which it holds so that a section of the blade projects beyond the lower surface of the foot. The tool is supported adjacent the saw foot by supporting means and more particularly directly over the foot, laterally in relation to the direction of sawing.

Such jig saws may be used for example in such a way that the foot is placed on the work to be saved and then pushed along by applying a force to the drive unit, the sawing tool, normally a toothed jig saw blade, having its active part protruding into the work and cutting it. In this respect a large area of the jig saw blade on both sides thereof runs on guide means operating directly over the jig saw foot so that the jig saw blade is steadied and prevented from running skew. It is thus possible to perform true sawing work with a neat, fine sawing cut.

Jig saws of this type are described in the German unexamined patent specification No. 3,420,442 and they have a guide means which is generally in the form of two steadying elements engaging the side of the tool and is securely fixed on the jig saw foot. The result is that it is possible to perform straight cuts with the jig saw blade standing perpendicular to the jig saw foot. However, when it comes to performing bevel cuts, that is to say cuts in which the drive unit has to be tilted about an axis extending in the normal direction of sawing so that the plane of cutting by the tool is no longer at a right angle to the work, the cut is very much less regular, because in order to avoid the blade jamming in the guide means, i. e. snatching of the tool, the guide means has to be removed from the tool both when tilting and also when carrying out the bevel cut so that in such cases the tool is no longer supported at the level of the jig saw foot. The guide means of such known jig saws thus only functions when cutting straight whereas during bevel cutting there are the familiar drawbacks of jig saws not having guide means, such as failing to cut straight, skew running and the like.

SHORT SUMMARY OF THE INVENTION

Accordingly one object of the invention herein is to devise a jig saw of the initially mentioned type which is provided with means for supporting and guiding the blade.

A further aim of the invention is to provide an improved jig or sabre saw which is prevented from running out of the cut or cutting at the wrong angle.

In order to achieve these or other purposes appearing herein, a jig saw in accordance with the invention is so designed that in the tilted condition of the drive unit the tool is supported at the jig saw foot inasfar as the guiding means is arranged so as to rock in the same direction as the drive unit, i. e. about the same axis or about an axis parallel thereto, i. e. so that points on the drive unit and the guiding means move in parallel planes about the axis. Owing to the rocking arrangement of the guide means it is possible for a rocking of the drive unit, and more especially of the tool driven thereby, to take place in such a way that there is no snatching or jamming of the tool on the drive unit and whatever the angle of tilt the sides of the tool are supported. This even makes it possible for bevel cuts in which the plane of engagement of the tool is at an angle of greater or less than 90° to the lower face of the foot to be executed precisely without any danger of the cut running skew or of the tool snatching. It is an advantage if the lateral support of the tool is placed independently of the respective tilt setting adjacent to the jig saw foot and more particularly if it is placed directly above the foot, something that leads to the steadying effect on the tool being near the work and the result of this is that the work-engaging part of the tool will be prevented from bending, since the lever arm of the tool on which forces may act laterally is very short. A further advantage here is that the surface supporting the moving tool of the guide means may be designed with a very large size, since these surfaces remain parallel to the side of the tool even if the tool is tilted so that in this respect as well there is a large supporting and guiding area without danger of skew running. Furthermore if the axes of tilting of the drive unit and of the guiding means coincide or are arranged parallel to each other, it is possible for the tilting motion of the two units to be coordinated without any difficulty.

Further useful developments of the invention will be seen from the claims.

In accordance with one such further development of the invention the axes of the tilting motion of the guide means and of the drive unit or tool are coincident and are within the plane of the jig saw foot lower face. This further form of the invention means that the position of exit of the cutting part of the tool remains in the plane of the foot lower surface whatever the setting of the tool, that is to say even when the drive unit is tilted, and does for example shift its position transversely in relation to the direction of cutting. This then means that the jig saw may be very much more easily adjusted, and more especially if it runs on a rail or a stop in the direction of cutting it is not necessary to readjust the distance between the saw foot and the respective guide part, even if the tool is tilted.

It is furthermore possible for the axes of the tilting motion of the guide means of the drive unit or of the tool to be coincident and at a distance from the lower face of the jig saw foot. The axes may be over or under the plane of the foot. The last-mentioned case is an advantage inasfar as if the jig saw foot does not have its lower face directly running on the work but for example on a support rail or if the work is moved and the jig saw is held stationary with a flange connection between its lower surface and a work support table with the tool protruding through an opening in the table into the position where it encounters the work. Owing to its spacing from the lower face of the foot it is possible in this case as well for the axes of tilt to be in the surface of the work nearest the jig saw.

In accordance with a further possible feature of the invention the guide device has two guide faces against which flat or other side surfaces of the tool run for a guiding action in the vicinity of the foot, more especially over the lower face of the foot, such guide surfaces each being formed on a steadying element. This makes it possible for the steadying elements to be simply replaced if damaged. The elements are best detachably secured on the guide means. They are preferably made of wear- and temperature resistant material such as ceramic.

The guide faces or the steadying elements on which they are placed may be adjusted to run generally transversely, in relation to the direction of sawing, towards the tool and the opposite direction away therefrom with a possibility of locking in the set position. This makes it possible to change the distance between the two opposite guide faces of the guide device so that adaptation to different thicknesses of saw blade is possible. The adjustment of the guide faces of the steadying elements is preferably across the direction of cut. The adjustability furthermore allows adjustment of the force pressing on the tool at the side and may furthermore be used to minimize wear thereof.

If the guide means is tiltingly mounted on the jig saw foot and is arranged on the drive unit for example and may be arranged on and rocked together within it in relation to the jig saw foot there is the advantage that the tool is very simple to use since the guide device is automatically moved as well when the drive unit and the tool connected therewith is rocked. The two guide faces make flat engagement with the sides of the tool. It will be clear that with this further feature of the invention the axes of pivot of the drive unit and of the guide device will coincide as a rule.

The guide means may comprise at least one holder which extends from the drive unit to the part of the tool adjacent to the jig saw foot and on their parts facing the tool holder may have the guide faces or steadying elements, the holder, arranged on one housing part of the drive unit, which is more especially made integral with it as a casting, may have two holding arms of which each one carries one of the guide faces or one of the steadying elements.

The holder may extend from the drive unit towards the part of the tool in the vicinity of the saw foot and may carry the guide faces or stabilizing elements in its part adjacent to the tool. The holder arranged on a housing part of the drive unit, which is more especially made integrally with this housing part and as a casting may have two holding arms each bearing one of the guide faces. This design simplifies the manufacture of the holder since it may be made integrally with the one housing part of the drive unit, as for example with its gearing cover.

The holding arms may be arranged to extend from their part adjacent to the drive unit as far as a position adjacent to the part of the tool to be guided more especially directly above the jig saw foot, and at least in this part, adjacent to the tool over the lower face of the foot and are arranged on opposite sides of the tool (considered with reference to the direction of the sawing) to support it, the guide faces or the steadying elements being located in this position adjacent to the tool. These features of the invention enable the steadying elements carried by the holding arms to be arranged directly adjacent to the lower face of the foot without impairing the guiding effect. The stable holding arms ensure that the steadying elements provide the desired supporting effect so that the saw blade as well is supported firmly.

The steadying elements on the holder or the holding arms may be arranged so that they may be adjusted towards and away from the adjacent side face of the tool and the steadying elements may be detachably mounted on the guide slide, which is able to slide on the holder or the respective holding arm, more especially transversely in relation to the direction of cut and each steadying element or the guide slide carrying it may cooperate with a set screw for adjusting it and abutting the holder or the holding arm thereof.

These further features of the invention make possible an adjustment of the steadying elements and of the guide surfaces so that the pressing force acting on the tool may be varied. In this connection the provision of a setting screw allows precise adjustment.

A further development of the design calls for an angled form of both of the holding arms which then have a support section extending, from the part associated with the drive unit, downwards towards the saw foot, and an adjacent guide part which in the non-tilted position of the drive unit extends downwards at an angle of for example approximately 45° to the plane of the foot lower surface on which the respective steadying elements and the guide slides are arranged adjustably or otherwise. Preferably, as viewed in the direction of cutting, the jig saw foot has a recess on each side of the tool adjacent to the respective holding arm so that the guide or another part of the adjacent holding arm may plunge into this recess on tilting the drive unit, in such a way that an angle of tilt of more especially 45° is possible.

These further features of the invention are a simple way of ensuring that the drive unit may be tilted through a relatively large angle. The larger the angle of tilt the more the guide part of the one holding arm enters into the recess, if present, so that the angle of tilt to either side will be equal to approximately 45°. At the same time the holding arms may serve to limit the degree of tilt inasfar as they abut a part of the jig saw foot.

The device in accordance with the invention may also be used with advantage using a tool in the form of a file, in which case the guide faces or the steadying elements engage the sides of the file or the sides of a guide rib formed on the file.

Two embodiments of the invention will now be described with reference to the accompanying drawings.

DETAILED ACCOUNT OF WORKING EMBODIMENTS OF THE INVENTION

Figure 1:
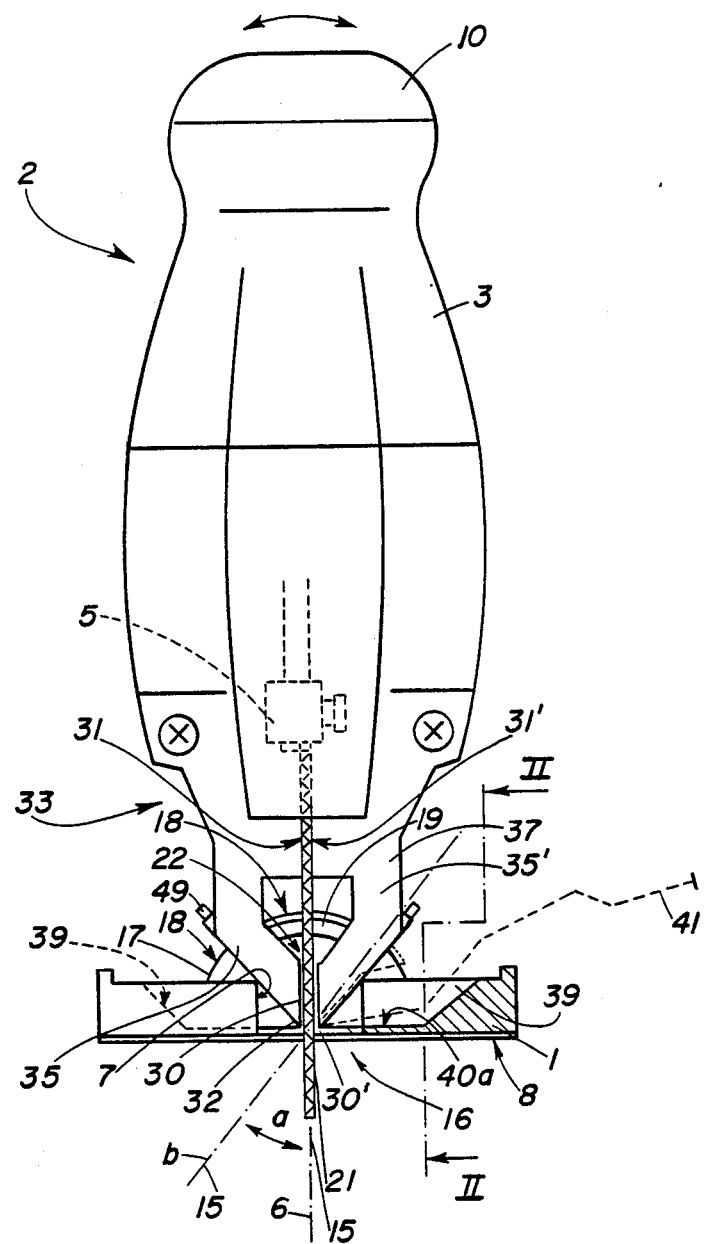
FIG. 1 shows a front view of the jig saw in accordance with the invention with the jig saw foot partly broken away and with a possible tilted position of the jig saw marked in chained lines.
Figure 2:
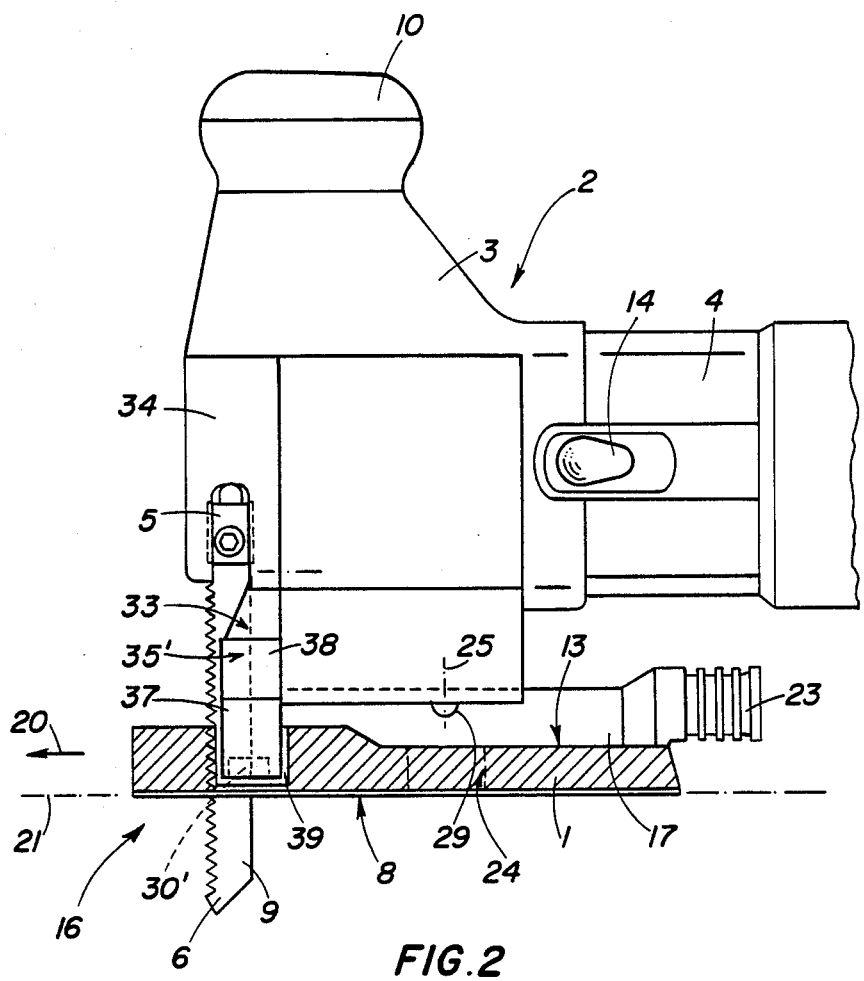
FIG. 2 is a side view of the jig saw of FIG. 1 with a partial section taken on the line II—II of FIG. 1.

Referring firstly to FIGS. 1 and 2, an account will be given of the first form of the jig saw of the invention. The saw possesses a foot 1 carrying a drive unit 2 whose main parts are a motor head 3 comprising gearing and a drive assembly 4 in the form of a cylindrical motor which is flange-mounted on the head 3. The drive unit 2 causes a tool holder 5, mounted at its front part, to perform a vertical reciprocating motion. The tool 6 is detachably mounted in the holder 5 and projects down through the foot 1. In the present example of the invention the tool is in the form of a jig saw blade which extends through an opening 7 in the jig saw foot 1 so that its cutting section 9 projects downwards from the lower surface 8 of the foot. This surface may, as in the embodiment illustrated, be provided as the surface of the foot or it may be constituted by a coating on the foot in order not to damage the work (not shown). During operation the jig saw is generally so used that the underface of the foot rests on the work to be sawn. The user holds the jig saw with one hand on the motor head 3, whose upper part is in the form of a grip 10, while his or her other hand holds the housing of the drive assembly 4, on which there is a switch 14 for turning the saw on and off, and possibly a control for varying the speed of the motor. The jig saw is moved along the desired line of cut over the work so that the latter is cut by the working part 9 of the jig saw blade.

The drive unit 2 and the tool 6 driven thereby are mounted on the jig saw foot so as to be able to tilt in relation to it, i. e. so that the drive unit may tip to the side in terms of the direction of cutting. The drive unit may be set at any desired angular position in relation to the saw foot 1 so that not only upright or perpendicular cuts may be performed, in which the plane 15 of the tool is at 90° to the plane of the foot and parallel to the direction of cutting (indicated by a in FIG. 1), but also bevel cuts in which the tool plane 15 is still in the direction of cut but is at an oblique angle to the plane of the foot (indicated at b in FIG. 1 by way of example). Furthermore the saw has a guide device 16 supporting the tool 6 adjacent to the foot and preferably at the same level as it or more particularly directly above the foot lower surface 8 at opposite sides. This guide device 16 is fully effective whatever the position of the tool, that is to say both in the position a and also in different positions of tilt such as b.

This possibility of tilting of the drive unit 2 in relation to the jig saw foot is made possible as follows in the working example. On the upper side 13 of the jig saw foot 1 facing the drive unit there is a piece of duct 17 or girder which is made integrally with the foot. It is located in the median part of the foot 1 and extends in the length direction thereof, i. e. in the direction of the cut. It extends from a point near the rear end of the jig saw foot forwards to a point just short of the opening 7 for the tool 6. As more especially shown in FIG. 1, the duct 17 is curved upwards and its top face 18 is a part cylindrical face subtending an angle of 180° in the present working example.

On its lower side and more particularly adjacent the motor head 3 the drive unit 2 is also provided with a concave curved section 19 whose radius of curvature is the same as that of the top face 18 which it engages, when the drive unit 2 is supported, the angle subtended by the section 19 being substantially less than that of the duct 17 so that there is some play for a sidewards displacement about a pivot axis 21 which is defined by the longitudinal axis of the part-cylindrical duct 17 and in the present embodiment of the invention it extends in the length direction of the saw foot 1, i. e. in the direction 20 of cut of the jig saw. This axis is in the plane of the lower face of the foot.

The duct 17 has its end adjacent to the tool 6 it has an aspiration opening 22 and at its back end the duct 17 has a suction connection 23 which may be connected with a suction duct so that saw dust may be sucked off from the point at which the tool is cutting. Furthermore the jig saw foot 1 is made hollow at least in part and on its lower face it has an opening 24, marked in broken lines, through which a screwdriver may be introduced in order to loosen or tighten the set screw 25 (marked in broken lines in FIG. 2) connecting the duct 17 with the motor head 3. In the slackened state of the screw 25 the drive unit 2 may be rocked in relation to the jig saw foot 1, the part 19 sliding on the top face 18 of the duct 17 in the length direction, the pivoting motion of the set screw 25 being allowed by a slot 29 extending in the peripheral direction of the duct 17.

It is further to be noted that in the case of the type of pivot connection and mount just described the design is particularly convenient, although the invention may also be used with other types of pivot connections and it is in no way limited to the one described.

Figure 3:
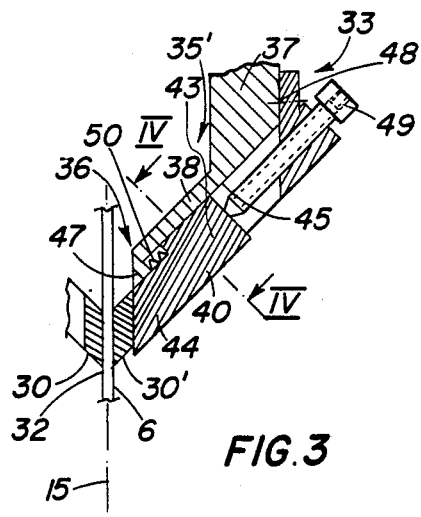
FIG. 3 illustrates a part of the guide means used in the jig saw of FIGS. 1 and 2 on a greater scale with a part of one holding arm sectioned on the line III—III of FIG. 4.

The guide device 16 briefly noted above has two steadying elements 30 and 30' which are arranged on opposite sides of the tool 6 and whose surfaces facing the sides 31 and 31' of the tool are in the form of guide or bearing faces 32 (see FIG. 3 as well). The steadying elements 30 and 30' and their guide surfaces 32 are at the level of the jig saw foot 1 directly above the lower face 8 of the foot and engage the tool 6 on both sides 31 and 31' thereof. As a result the tool 6 is steadied and able to resist a thrust to the side so that when using the jig saw the machine operation takes place precisely along the true line of cut without wandering from it or running skew.

The steadying elements 30 and 30' engaging the sides 31 and 31' of the tool 6 have a generally prismatic form and consist of a material which is able to resist raised temperatures and friction. More especially, they may be manufactured of a ceramic material such as an oxide ceramic.

The guide faces 32 are preferably flat faces and more especially have a rectangular outline. In the direction of cutting they may have a size of about 6 to 8 mm and in the height direction they have a size of about 4 mm. Accordingly the tool 6 is supported over relatively large areas so that it will resist heavy forces acting on the cutting section 9. (In a further possible form of the invention not illustrated here, the guide faces are curved or pointed so that contact is restricted to a line). In all the working examples of the invention the guide faces 32 engage the tooth-free part of the tool 6 so that there is no chance of damage to the very hard ceramic material and to the cutting means of the tool 6.

In order to maintain the guiding action on both sides of the jig saw blade 6 at the level of the jig saw foot whatever the setting of the drive unit 2 and more especially in the tilted position thereof (setting for bevel cuts), the guide device 16 is arranged so that its steadying elements 30 and 30' are able to be rocked about an axis which is the same as the axis of rocking of the drive unit 2 or is parallel to such axis, in relation to the jig saw foot 1. This means that the guide device may take part in the pivoting motion of the drive assembly so that in the rocked positions as well there will be a parallel engagement over a large area of the guide surfaces 32 on the sides 31 and 31' of the jig saw blade without any clamping or snatching effect. The pivoting arrangement of the guide device 16 may be on the jig saw foot 1 itself in accordance with one form of the invention which is not shown here. In the preferred case however as shown in the drawing the guide device 16 is however arranged on the drive unit 2 and able to the rocked with it in relation to the jig saw foot 1.

It will be clear that for the sake of simplicity the pivot axes of the drive unit 2 and of the guide device 16 coincide and in the drawing these axes are combined in the pivot axis 21, which runs in the plane of the lower face of the foot 1, something involving the advantages mentioned above. In further possible forms of the invention which are not illustrated, this common axis 21 of pivoting may be arranged at some distance from the plane of the lower face of the foot 1, that is to say over or under it. It is an advantage if the level of this pivot axis may be varied, more especially steplessly. This makes it possible to so set the position of the pivot axis 21 that it s directly in the surface of the work so that on pivoting the drive unit 2 the tool is not offset in relation to the surface of the work.

As will be seen from FIGS. 1 through 4, the guide device 16 has a holding means 33 for the steadying elements 30 and 30' which is fixedly secured to the drive unit 2. It is preferably made integrally with a removable housing part 34—in the present case the cover to the gearing—of the drive unit 2 and together with the latter forms a unit in the form of a single casting.

The main parts of the holding means are two holding arms 35 and 35', which extend from the drive unit 2 towards the jig saw foot 1 so that there end part 36 remote from the drive unit 2 carrying the steadying elements. In order for them to extend as far as positions in the direct vicinity of the lower face 8 of the foot 1, the end parts 36 adjacent to the guide faces 32 plunge into the opening 7 in the jig saw foot 1.

Each side 31 and 31' of the tool 6 has a holding arm 35 and 35' therefor which as seen from the side in FIG. 2 extends downwards generally in the length direction of the tool and will be seen from the front view of FIG. 1 to be bent or angled towards the tool 6. Each holding arm has a supporting part 37 which extends from the part adjacent to the drive unit 2 generally parallel to the adjacent side 31 and 31' of the tool downwards towards the jig saw foot 1. Generally at the same level as the duct 17 there is then a further straight guide part 38 which extends obliquely downwards and towards the tool so that its end part 36 is beside the tool 6 directly over the lower face 8 of the foot 1.

The angled shape of the two holding arms 35 and 35' is necessary in this form of the invention in order to obtain the maximum angle of tilt of the drive unit 2. A further contribution to allowing for the largest possible angle of tilt is provided by the recesses 39 in the jig saw foot 1 directly over the respective holding arms 35 and 35'. They are inwardly open towards the opening 7 and extend transversely in relation to the direction 20 of cut and their breadth as measured in the direction of cut is somewhat greater than the breadth of the respective holding arm, more especially at its guide part 38. If the drive unit 2 is now rocked it is possible for the holding arm 35 or 35' which is lowest to be received in the respective recess 39.

Figure 4:
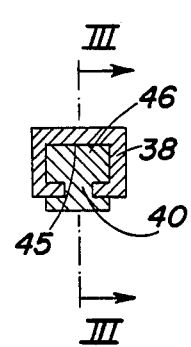
FIG. 4 is a section taken on the line IV—IV of FIG. 3 through the holding arm shown in FIG. 3.

In the working example illustrated the two guide parts 38 of the holding arms make an angle of about 45° to the lower face 8 of the jig saw foot in the home position (i. e. the setting for making a plain or non-bevel cut). Accordingly the drive unit 2 may be rocked about the pivot axis 21 through about 45° to either side by such an amount that the longitudinal axis of the respectively lowest guide part is generally parallel to the lower face 8 of the foot 1, in which condition it will rest on the bottom of the respective recess 39. The latter is made somewhat upwardly oblique at its part remote from the opening 7 so that the supporting part 37 may also be partly received. In FIG. 4 the position assumed by one holding arm is marked in broken lines at 41 when the drive unit 2 is in its pivoted position in which the tool plane 15 is in the position b.

For adaptation of the gap between the mutually opposite guide faces 32 of the steadying elements 30 and 30' to suit the respective thickness of the tool being used the steadying elements 30 and 30' are able to be adjusted in a direction generally perpendicular to the tool towards and away from it and are able to be locked on the respective holding arm in the respective settings. It will be seen from FIGS. 3 and 4 the respective steadying element 30 and 30' is seated on a guide slide 40, which may be a detachable or permanent form of fixation, and the guide slide 40 is able to slide on the guide part 38 towards and away from the associated tool side 31 or 31'. The steadying element is arranged on the slide side 44 facing the tool 6. The guide part 38 has a T-like slot 45 running in it in the length direction—or it is possible to have a dovetail slot—in which slot the generally prismatic slide 40 has its sliding part 46 so that it may slide in the length direction. At the end 44 the slide 40 has a smaller height and in this part there is a raised part 47 in the bottom of the guide slot 45 so that the slide part 43 remote from the work may run up against it. The guide slide 40 is thus able to be pushed into the guide slot 45 and is secured therein so that it is not able to fall out of it.

In the inserted state of the guide slide 40 the axial end remote from the tool 6 of the guide slot 45 is shut off by a removable set screw carrier 48 which has a threaded hole through it into which a set screw 49 may be screwed to and fro in the direction of motion of the slide 40. The latter acts on the back side of the slide so that the steadying elements 30 and 30' attached to the slide are able to be clamped in relation to the tool adjacent to the saw foot and in the opening 7 of the foot. The carrier 48 is more especially screwed to the supporting part 37.

In order to facilitate changing the tool 6 it is possible to have a spring 50, as for example a helical spring, engaging the raised part 47 and the opposite slide parts 43 and 46, respectively. When the set screw 49 is slackened off this spring will press the slide 40 away from the tool 6.

In the working example shown in FIGS. 1 through 4, in which the direction of sliding of the steadying elements 30 and 30' is at an oblique angle, more especially approximately 45°, to the plane 15 of the tool, the steadying elements have a cross section essentially in the form of a parallelogram, the one side forming the respective guide face 32, which on adjustment of the position of the guide slide 40 is able to be slid while keeping is position parallel to the associated tool side 31 or 31', respectively.

In the case of a further possible working example of the invention which is not illustrated the steadying elements are fixedly secured directly to the holder or holder arms. In this connection it is additionally possible to adjustably mount the holder or the holder arms on the drive unit so that this will provide for adjustability.

Figure 5:
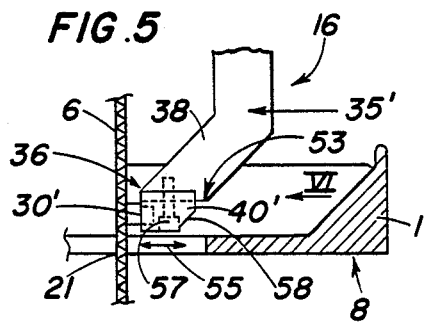
FIG. 5 illustrates a further working example of the invention from the front and in partial section but only showing part of a holding arm and the jig saw foot.
Figure 6:
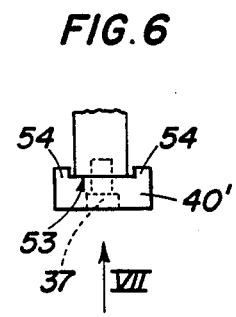
FIG. 6 is a lateral view of the embodiment of the invention of FIG. 5 looking in the direction VI in FIG. 5.
Figure 7:
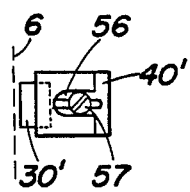
FIG. 7 is a view from below of the guide means of FIGS. 5 and 6 looking in the direction of FIG. 6.

In the working example of the guide device 16 shown in FIGS. 5 through 7 the guide part 38 of the holding arms 35 and 35' has a flat on the end part 36 so as to be parallel to the lower face 8 of the foot (marked at 53) and this flat has a guide slide 40' placed against it from below. The slide 40' has its opposite sides (that is to say the surfaces which are lateral with respect to the direction of motion) slightly overlapping two guide edges 54. This means that the guide slide 40' is guided for motion at a right angle to the tool plane 15 and—in the non-tilted position of the drive unit 2—in a plane parallel to the foot lower surface 8 (as indicated by the arrow 55). The slide 40' has a slot 56 therein aligned with the direction 55 of sliding and a set screw extends through the slot and is screwed into the guide part 38. The steadying element 30 or 30', respectively, is integrated in the slide 40'. In this embodiment it is accordingly possible to detachably screw the slides 40', which are in fact holding parts able to displaced within certain limits, from below through the opening 7 to the two guide parts 38. And in the detached condition of the set screws 57 the steadying elements carried by the slide may be set in relation to the tool 6.

On their edge facing the foot lower face 8 and away from the tool 6 the guide slides 40' are preferably chamfered at 58 in such a way that the oblique face so produced runs parallel to the length direction of the associated guide part 38 so that in the tilted condition the slides 40' do not project beyond the foot lower face 8.

It will be clear that the described form of the holding arms does not have to be as shown and that many different variations are possible therein are feasible, although however the configuration has to ensure that the steadying elements carried by them are arranged in the vicinity of the foot lower face 8 so that on tilting the drive unit the holding arms do not unnecessarily restrict the angle of tilt by abutting a part of the jig saw foot. Furthermore the holding arms should have sufficient rigidity to support the steadying elements. The design should furthermore be such that the recesses 39 are as small as possible in order not to unduly impair the strength of the jig saw foot.

The guide device in accordance with the invention may also be embodied in jig saws in which, departing for the form described, have rockingly mounted pressing rollers which serve to support the tool and possibly to produce a rocking motion acting on the back of the tool.

We claim:

1. A jig saw for cutting in a cutting direction, comprising:
    a saw foot adapted to be rested on a support and having a sliding face for engaging such support and being moved along a line thereon in a cut direction;
    a drive unit tiltably mounted on said foot for pivoting about a drive unit axis extending in the cutting direction:
    a tool holder connected with and adapted to be reciprocated by said drive unit:
    an elongated tool having tool sides substantially parallel to the cutting direction, said tool extending through said foot so that a cutting section thereof extends downwards beyond said foot, said elongated tool being adapted to be held by said tool holder, and
    guide means pivotally mounted on said jig saw foot adapted to laterally support said tool at a position adjacent to said foot, said guide means being able to be tilted with said drive unit such that points on said drive unit and on said guide unit move in parallel planes that are normal with respect to said axis of said drive unit, said tool being supported by said guide means in the tilted position thereof, said guide means including at least one holder fixedly secured to said drive unit and carrying said steadying elements so as to position guide faces adjacent to said tool directly over the sliding face of said saw foot, said drive unit including a housing part integral with said holder, said holder being a casting with two holding arms, said holding arms extending from adjacent said drive unit towards said tool near said foot so that a holding arm is positioned on each side of said tool, said guide faces being adapted to steady said tool.

2. A jig saw for cutting in a cutting direction, comprising:
    a saw foot adapted to be rested on a support and having a sliding face for engaging such support and being moved along a line thereon in a cut direction;
    a drive unit tiltably mounted on said foot for pivoting about a drive unit axis extending in the cutting direction:
    a tool holder connected with and adapted to be reciprocated by said drive unit:
    an elongated tool having tool sides substantially parallel to the cutting direction, said tool extending through said foot so that a cutting section thereof extends downwards beyond said foot, said elongated tool being adapted to be held by said tool holder, and
    guide means pivotally mounted on said jig saw foot adapted to laterally support said tool at a position adjacent to said foot, said guide means being able to be tilted with said drive unit such that points on said drive unit and on said guide unit move in parallel planes that are normal with respect to said axis of said drive unit, said tool being supported by said guide means in the tilted position thereof, said guide means including at least one holder fixedly secured to said drive unit, said holder carrying said steadying elements, said holder extending from said drive unit toward said tool adjacent said foot, said steadying elements being positioned adjacent said tool, said holder including a first holding arm and a second holding arm, each of said holding arms including a first portion extending from said driving unit toward said foot and a second portion angled with respect to said first portion extending towards a respective tool side at an angle to said foot, said second portion of said holding arm forming an angle of approximatey 45° with respect to said foot and carrying said steadying element and said guide slides in an adjustable manner, said second position of said holding arms being adapted to plunge into recesses formed in said foot so that said guide means may be rocked through 45° to each side.

3. The jig saw as claimed in claim 1 wherein said guide means is adapted to be concentrically tilted about said axis, said axis being in said sliding face of said foot.

4. The jig saw as claimed in claim 1 wherein said guide means is adapted to be tilted about a further axis parallel to said first-mentioned axis, both said axes being spaced from said sliding face.

5. The jig saw as claimed in claim 1 wherein said guide means comprises two steadying elements having guide faces for contacting opposite sides of said tool at positions adjacent to said foot, said tool being between said guide faces.

6. The jig saw as claimed in claim 5 wherein said guide faces are adapted to make flat contact with said tool sides at positions directly over said foot at parts of said tool free of cutting means.

7. The jig saw as claimed in claim 5 wherein said steadying elements with said guide faces include adjusting means for adjusting the steadying elements in a direction normal to said cut direction towards and away from said tool and are able to be locked in positions in relation to said tool.

8. The jig saw as claimed in claim 1 wherein said holding arms extend towards said tool as far as parts directly over said foot.

9. The jig saw as claimed in claim 8 wherein said foot having recesses therein to receive parts of said holding arms carrying said steadying elements and so increase the angle of tilt of said guide means.

10. The jig saw as claimed in claim 9 comprising means for adjusting the steadying elements on said holding arms in a direction towards and away from said tool sides to be engaged by said guide faces.

11. The jig saw as claimed in claim 10 comprising respective guide slides and wherein said steadying elements are attached to said guide slides, said guide slides being able to be slid in relation to said respective holding arms.

12. The jig saw as claimed in claim 11 wherein steadying elements are detachably joined to said respective holding arms by means of a dovetail groove for sliding motion in a direction substantially at a right angle to said tool sides.

13. The jig saw as claimed in claim 12 comprising respective set screws for adjusting said steadying elements on said holder.

* * * * *